United States Patent … US 7,506,666 B2
Tubby et al. … Mar. 24, 2009

(54) ANTI-DRIP RING AND DRIP SEAL

(75) Inventors: Brian J. Tubby, Cheshire, CT (US); Andrew M. Candelora, East Haven, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 581 days.

(21) Appl. No.: 11/118,249

(22) Filed: Apr. 29, 2005

(65) Prior Publication Data

US 2006/0243652 A1    Nov. 2, 2006

(51) Int. Cl.
F16L 55/027    (2006.01)
B01D 35/00    (2006.01)

(52) U.S. Cl. .......................... 138/40; 210/248
(58) Field of Classification Search .............. 210/136, 210/418, 443, 248; 138/40
See application file for complete search history.

(56) References Cited

U.S. PATENT DOCUMENTS

| 4,212,739 | A | 7/1980 | Hilton et al. |
| 4,923,601 | A | 5/1990 | Drori |
| 5,584,987 | A | 12/1996 | Mules |
| 6,488,848 | B1 | 12/2002 | Smith |
| 6,632,355 | B2 | 10/2003 | Fritze |
| 2002/0023863 | A1 | 2/2002 | Binder et al. |
| 2003/0019819 | A1* | 1/2003 | Fritze .................. 210/767 |
| 2005/0092673 | A1* | 5/2005 | Fritze .................. 210/235 |

OTHER PUBLICATIONS

International Search Report dated Nov. 30, 2006.

* cited by examiner

*Primary Examiner*—Matthew O Savage
(74) *Attorney, Agent, or Firm*—Aleksander Medved

(57) ABSTRACT

An anti-drip filter assembly includes a filter cartridge assembly, a sump and an anti-drip element. The filter cartridge assembly includes a filter element and an end cap permanently attached to the filter element. The sump encloses the filter cartridge assembly. The anti-drip element is separate and distinct from the filter cartridge and the sump and is configured for insertion into the unfiltered fluid flow path.

10 Claims, 6 Drawing Sheets

ANTI-DRIP RING AND DRIP SEAL

BACKGROUND OF THE DISCLOSURE

The present disclosure relates in general to a replaceable fluid filter assembly and, in particular, to an anti-drip device for a replaceable fluid filter assembly that provides for the removal of the replaceable fluid filter assembly with a minimum of fluid spillage.

Replaceable fluid filter assemblies for industrial, commercial and consumer use are widely known throughout the industry. For example, modern refrigerators, which provide drinking water and produce ice, and beverage dispensing machines, such as coffee makers and soda dispensers, commonly use an internal filtration system having replaceable fluid filter assemblies for purifying the water.

Like most filtration systems and especially with respect to consumer appliances, the trend is toward using smaller, more compact, filter assemblies, frequent replacement of the filter media within the filtration system is required. Therefore, these filtration assemblies are typically equipped with replacement filter assemblies that can be disengaged from a system and replaced without requiring the removal of other components of the filter system. Unfortunately, such filter assemblies may not always be placed in the most accessible location or at the most desirable orientation conducive to reduce spillage during the replacement process.

Replacement filter assemblies typically include a filter cartridge in fluid communication with a manifold that is designed to be inserted into and removed from the source of fluid. Known filter cartridges include a filter element, such as a granular activated carbon filter element, located within a housing.

One representative example of a prior art filter assembly having a replaceable filter cartridge is disclosed in commonly assigned U.S. Pat. No. 6,632,355 to Fritze, the disclosure of which is herein incorporated by reference to the extent not inconsistent with the present disclosure. The Fritze patent discloses a replaceable water filter assembly having a cartridge and a manifold assembly fluidly coupled to the cartridge and to a water supply system. The cartridge, which includes a filter housing, a filter element, a filter dam, and an end cap, is a self contained, permanently assembled unit. The end cap of the cartridge unit includes a first flow path for supplying unfiltered water to the filter element and a second flow path for removing filtered water from the filter element. In the unfiltered water flow path, the end cap includes a plurality of small-diameter through bores. These small-diameter through bores are designed to prohibit water from spilling out of the filtered water flow path, when the water filter assembly is removed from the water supply system, by developing a vacuum within the cartridge. In addition, as part of the spill proof design of the system, spring valves are included in the unfiltered water flow path of the water manifold assembly. These spring valves are mechanically opened when the water filter assembly is coupled to the water supply system and mechanically closed upon detachment of the water filter assembly from the water supply system, thereby prohibiting the flow of unfiltered water from the water filter assembly during replacement.

One disadvantage of the known prior art is that the small-diameter through bores are integrally formed with the end cap, which, in turn, is integrally assembled into the cartridge. Since cartridges are not always associated with a manifold assembly located in locations where spillage is a concern, two distinct lines of cartridges must be produced: those to be used in low-spillage filter assemblies and those to be used in situations where spillage is not a concern. Another disadvantage of the prior art is the cost and complexity associated with having both mechanical spring valves and the small-diameter through bores to prohibit spillage from the replaceable filter assembly.

Thus, there is a need for an inexpensive, reliable replaceable fluid filter assembly that can be quickly and conveniently replaced. There is a particular need for a replaceable fluid filter assembly that can minimize spillage during cartridge replacement, while not significantly obstructing the flow or increasing the pressure drop. There is a further need for a replaceable fluid filter assembly that optionally can be supplied with an anti-drip feature after manufacture of the fluid filter cartridge.

SUMMARY OF THE DISCLOSURE

One representative embodiment of the present disclosure includes an anti-drip element for use with a fluid filter assembly having an unfiltered fluid flow path and a filtered fluid flow path, the anti-drip element being configured for selective insertion into the unfiltered fluid flow path.

Another representative embodiment of the present disclosure includes an anti-drip element for use with a fluid filter assembly having an unfiltered fluid flow path. The anti-drip element includes a generally annular ring having a thickness in a longitudinal direction, an inner radius, an outer radius and a slot that extends from the inner radius to the outer radius. The anti-drip element also includes a plurality of holes circumferentially spaced around the ring and extending in the longitudinal direction through the thickness of the ring.

In one aspect of the present disclosure, the anti-drip element includes a plurality of holes ranging from nine holes to thirty-six holes with the diameter of each of the holes ranging from approximately 0.020 inches to approximately 0.125 inches.

In another aspect of the present disclosure, the anti-drip element includes a plurality of holes ranging from twelve holes to twenty-four holes with the diameter of each of the holes ranging from approximately 0.040 inches to approximately 0.060 inches.

In even another aspect of the present disclosure, the anti-drip element includes one or more legs extending in the longitudinal direction from the annular ring, the legs being configured for insertion into the unfiltered fluid flow path of the fluid filter assembly. The plurality of holes extends in the longitudinal direction through the legs.

In a further aspect of the present disclosure, the anti-drip element includes four legs extending in the longitudinal direction from the annular ring, each leg being configured for insertion into the unfiltered fluid flow path of the fluid filter assembly, and each leg including from four to six holes.

In another representative embodiment of the present disclosure, an anti-drip filter assembly having an unfiltered fluid flow path is provided. The anti-drip filter assembly includes a filter cartridge assembly, a sump and an anti-drip element. The filter cartridge assembly includes a filter element and an end cap permanently attached to the filter element. The sump encloses the filter cartridge assembly. The anti-drip element, which is separate and distinct from the filter cartridge and the sump, is configured for selective insertion into the unfiltered fluid flow path.

In one representative aspect of the anti-drip filter assembly of the present disclosure, the anti-drip element includes an annular ring and at least one flap coupled to the annular ring and configured to allow a flow of unfiltered fluid into the filter cartridge and to prohibit a flow of unfiltered fluid out of the cartridge. The flap may be a flexible annular plate.

In another representative aspect of the anti-drip filter assembly of the present disclosure, the anti-drip element may extend between the filter cartridge and the sump.

In even a further representative embodiment of the present disclosure, an anti-drip filter assembly includes a filter cartridge assembly, a sump and an anti-drip element. The filter cartridge assembly includes a filter element and an end cap permanently attached to the filter element. The sump encloses the filter cartridge assembly. The anti-drip element, which is separate and distinct from the filter cartridge and the sump, is positioned in the unfiltered fluid flow path. The anti-drip element includes a generally annular ring having a thickness in a longitudinal direction and a plurality of holes circumferentially spaced around the ring and extending in the longitudinal direction through the thickness of the ring.

In another representative aspect of the present disclosure, the anti-drip element is removably positioned in the unfiltered fluid flow path.

In a further representative aspect of the present disclosure, the anti-drip element is configured to be inserted into the unfiltered fluid flow path from the exterior of the sump.

Other objects and advantages of the disclosure will be apparent from the following description, the accompanying drawings and the appended claims.

These and other features of the subject disclosure will become more readily apparent to those having ordinary skill in the art from the following detailed description of the representative embodiments.

DETAILED DESCRIPTION OF REPRESENTATIVE EMBODIMENTS

As discussed hereinabove, the present disclosure overcomes several disadvantages associated with the known prior art fluid filter assemblies. The advantages and other features of the fluid filter assemblies disclosed herein will become more readily apparent to those having ordinary skill in the art from the following detailed description of the representative embodiments taken in conjunction with the drawings which set forth some representative embodiments of the present disclosure.

Figure 1:
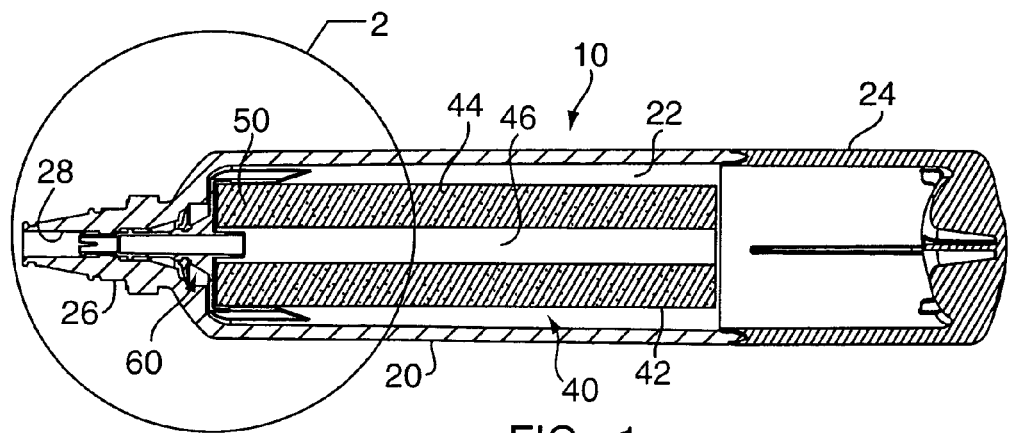
FIG. 1 is a schematic cross-sectional view of a fluid filter assembly incorporating an anti-drip element according to one representative embodiment of the present disclosure.

Referring now to the drawings wherein like reference numerals identify similar structural elements and/or features of the subject disclosure, there is illustrated in FIG. 1 a replaceable fluid filter assembly constructed in accordance with an exemplary, representative embodiment of the subject disclosure and designated generally by reference numeral 10. Filter assembly 10 includes a sump 20 and a filter cartridge assembly 40. Sump 20 includes an interior chamber 22 and a closure cap 24 at the bottom end thereof for enclosing cartridge assembly 40 within sump 20. Closure cap 24 may be permanently attached, via spin welding, ultrasonic welding, hot plate welding, induction welding, overmolding, or removably attached, via mechanical means or by other methods that would be understood by one skilled in the art to operatively accomplish the attachment function, to the bottom end of sump 20.

Figure 2:
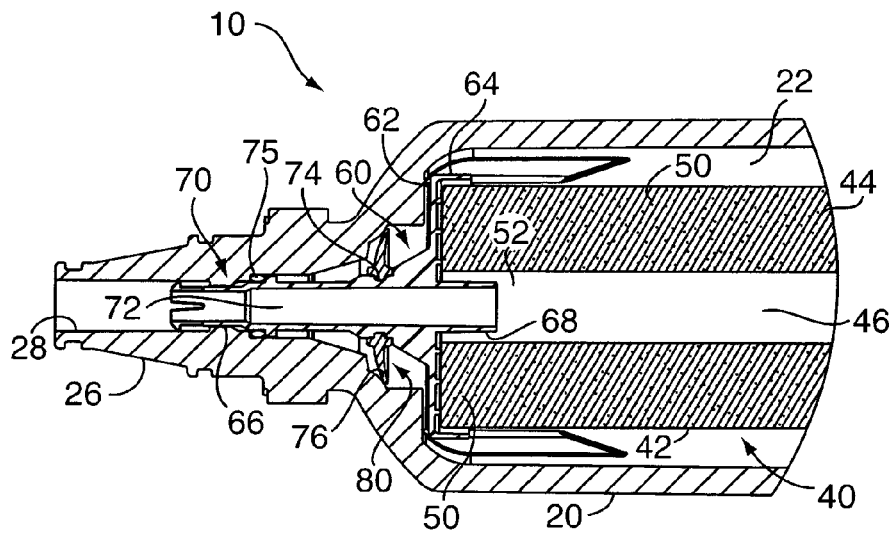
FIG. 2 is an enlarged view of a portion of FIG. 1.
Figure 5:
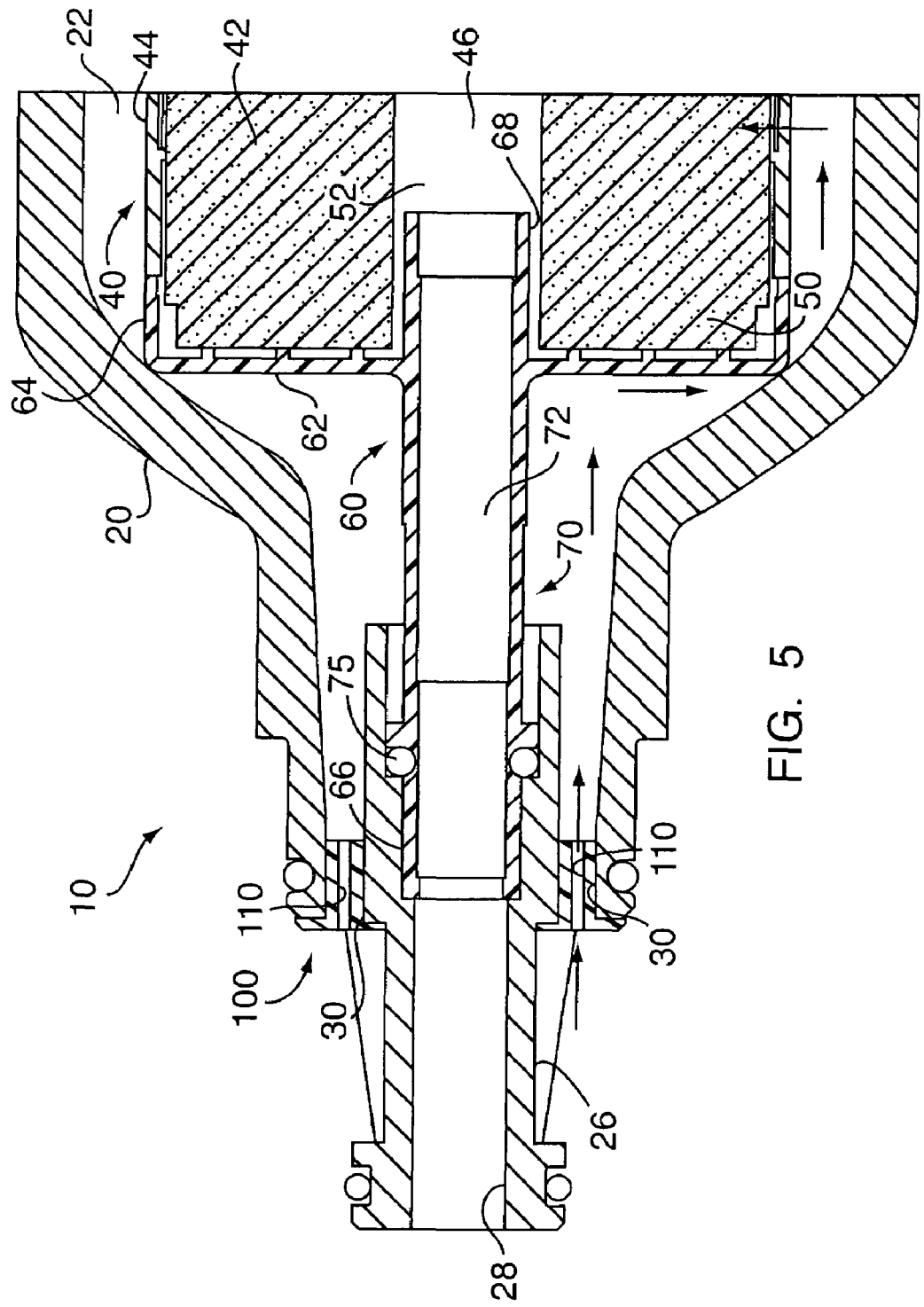
FIG. 5 is a schematic cross-sectional view of a portion of a fluid filter assembly incorporating an anti-drip element according to another representative embodiment of the present disclosure.

As best shown in FIG. 2, sump 20 has an inlet/outlet top portion 26 at the top end thereof for the ingress and egress of fluid into interior chamber 22 of sump 20. Inlet/outlet top portion 26 includes a central through bore 28 through which filtered fluid may exit the fluid filter assembly 10. Central through bore 28 may be generally aligned with a central axis of sump 20. As best shown in FIG. 5, circumferentially surrounding central through bore 28 are four through bores 30 through which unfiltered fluid may enter fluid filter assembly 10. As is known in the art, the inlet/outlet top portion 26 is configured as a quick connect/disconnect fitting for mating with a corresponding manifold (not shown) in fluid communication with the filtration system. The filter system may be an internal water filtration system in an appliance, such as a refrigerator having a water dispenser and/or an ice maker or anyone of a plurality of other applications, as would be understood by one skilled in the art.

Referring to FIGS. 1 and 2, filter cartridge assembly 40 includes a filter element 42. Filter element 42 may include a generally cylindrical body portion 44 enclosing filter media for filtering fluid and having an axial cavity 46 that extends therethrough. The filter media may be granular activated carbon (GAC), as known in the art. Those skilled in the art will understand that other commercially available filter media could be used in place of the GAC, including, but are not limited to, depth, surface, media, ionic, membrane type filter media or any combination thereof that would perform the filtering function in an effective manner. Those skilled in the art will also appreciate that one or more of a variety of different forms of filter media could be enclosed within the body portion including, but not limited to, pleated media, woven or non-woven fibers, micro-fibers or carbon media or any combination thereof that would perform the filtering function in an effective manner. Flow through the filter media is achieved by the application of a static pressure difference across the filter, which may be generated, for example by external pressure applied upstream, a vacuum applied downstream, gravity, or other force.

Further, it will also be appreciated by those skilled in the art that axial cavity 46 may be hollow or may be filled, or partially filled, with a secondary filter media (not shown) and that body portion 44 may be surrounded, or partially surrounded, by a suitable pre-filter element (not shown). Axial cavity 46 may also contain a perforated liner tube (not shown) for providing additional support to filter element 42.

As best shown in FIG. 2, an end cap 60, as attached to the incoming end 50 of filter element 42. End cap 60 channels the incoming unfiltered fluid to the outer circumferential surface of filter element 42. The unfiltered fluid then travels radially inward through the filter media to cavity 46 and is filtered in the process. The filtered fluid exits filter element 42 through end 52 of axial cavity 46.

Figure 3:
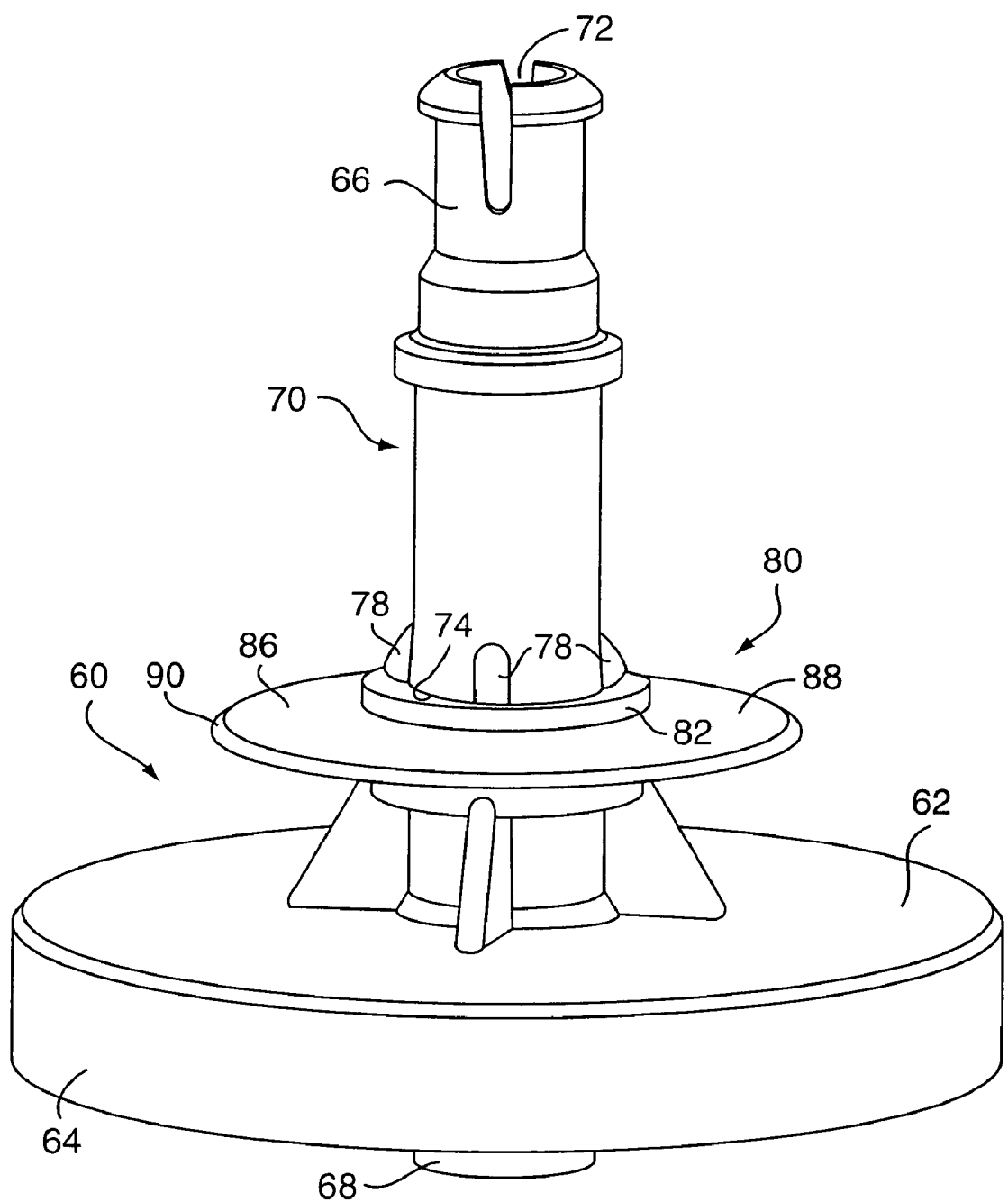
FIG. 3 is a perspective view of the anti-drip element mounted on an end cap according to the representative embodiment of FIG. 1.

End cap 60 is coupled/operatively connected to the incoming end 50 of filter element 42. As best shown in FIGS. 2 and 3, end cap 60 includes a cover plate 62 having a circumferential flange 64. End cap 60 further includes a cylindrical neck 70 extending in the longitudinally direction from cover plate 62. An upper portion 66 of neck 70 is configured for engagement with central through bore 28 of sump 20. A lower portion 68 of neck 70 is configured for insertion into end 52 of axial cavity 46 of filter element 42. Central passage 72 extends through neck 70 and provides a flow path for filtered fluid to exit from filter cartridge assembly 40. For a typical consumer appliance application, the diameter of central passage 72 may be on the order of about 0.2 inches. End cap 60 may be formed of any suitable material, including, for example, molded unfilled polypropylene homopolymers or any other materials that are sufficient for performing the desired function in the desired environment. End cap 60 and filter element 42 are typically glued together, but may be joined together by other methods known in the art to form filter cartridge assembly 40.

Upper portion 66 of neck 70 may include stepped and/or flanged portions for engaging and sealing with corresponding surfaces of through bore 28. Additionally, o-rings or other sealing members 75 (as best shown in FIG. 5) may be located between neck 70 and through bore 28 to isolate and prevent leakage between the unfiltered fluid flow path and the filtered fluid flow path.

Referring now to FIGS. 1 and 2, an anti-drip element 80 is shown located in the unfiltered flow path. Anti-drip element 80 allows unfiltered fluid to flow into filter element 42, yet prohibits the reverse flow of unfiltered fluid. The condition of reverse flow of unfiltered fluid would be most likely to occur when fluid filter assembly 10 is removed from the filtration system, leading to fluid spillage. Anti-drip element 80 minimizes the amount of unfiltered fluid that can exit or spill from the fluid filter assembly 10 when the filter assembly is manipulated during replacement of the filter assembly 10. Anti-drip element 80 is shown located between neck 70 of end cap 60 and through bore 28 of sump 20. Specifically, anti-drip element 80 is shown extending between an annular seat 74 formed on neck 70 and a valve seat 76 formed on through bore 28.

Figure 4:
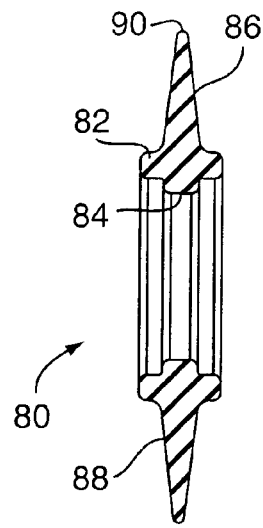
FIG. 4 is a cross-sectional view of the anti-drip element of according to the representative embodiment of FIG. 1.

As best shown in FIGS. 3 and 4, anti-drip element 80 includes an annular ring 82 having an inner diameter 84 that corresponds to the diameter of annular seat 74. Annular ring 82 may be formed of an elastomeric material, for example, a molded compliant silicone. Those skilled in the art will appreciate that other elastomeric materials may be suitable. The elastomeric material allows annular ring 82 to be slipped over protrusions 78 on neck 70. Protrusions 78 lie adjacent to seat 74 and aid in the retention of anti-drip element 80 to end cap 60.

Anti-drip element 80 further includes a flap 86 that flexes to allow unfiltered fluid under pressure to flow past anti-drip element 80 to filter element 42. As long as fluid filter assembly 10 is installed in filtration system and pressurized unfiltered fluid is flowing into filter fluid assembly, a gap between flap 86 and through bore 28 will be maintained and unfiltered fluid will reach filter element 42. As shown in FIGS. 3 and 4, flap 86 is a flexible, tapered annular plate 88 encircling annular ring 82. The outer edge 90 of flap 86 is configured to rest against valve seat 76 when the pressurized flow of unfiltered fluid towards filter element 42 is interrupted. Under such conditions, fluid on the downstream side of anti-drip element 80 will force flap 86 against valve seat 76, effectively preventing back flow of the unfiltered fluid. Flap 86 may also be formed of an elastomeric material, such as the above-mentioned molded compliant silicone. In one representative embodiment, annular ring 82 and flap 86 are molded as a single unit.

Figure 6:
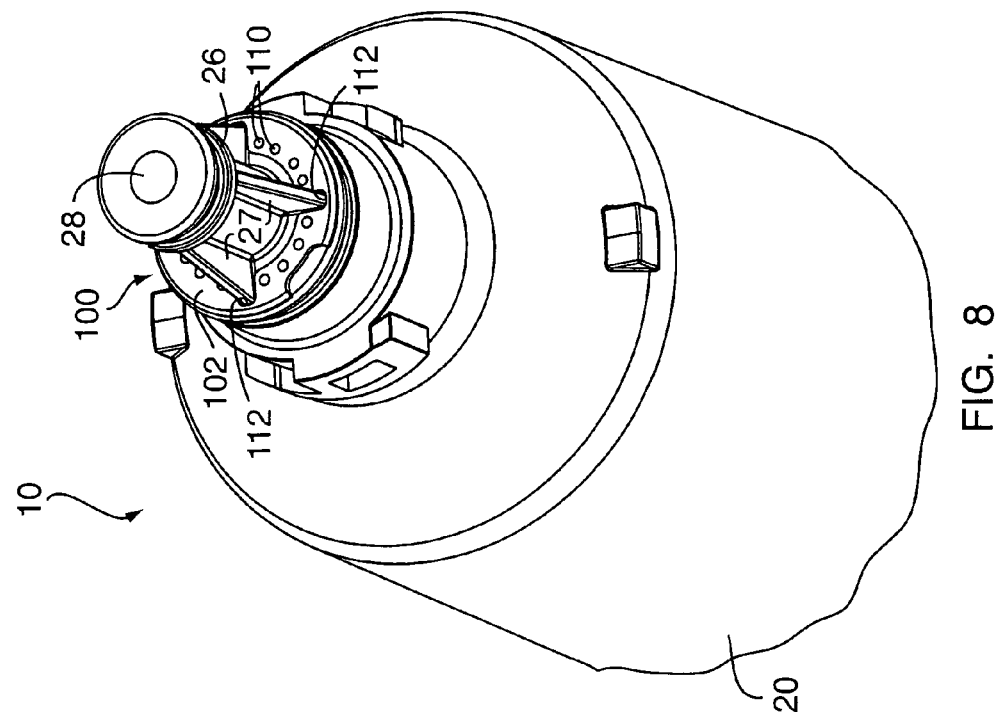
FIG. 6 is a perspective view of the anti-drip element according to the representative embodiment of FIG. 5.

FIGS. 5 and 6 illustrate another representative embodiment of the present disclosure. Anti-drip element 100 is shown positioned in through bores 30 at the inlet of the unfiltered fluid flow path entering inlet/outlet top portion 26 of sump 20. One of the advantages of this embodiment it that anti-drip element 100 may be removably positioned in the unfiltered fluid flow path. Moreover, anti-drip element 100 is configured to be inserted into the unfiltered fluid flow path from the exterior of sump 20. Thus, a fluid filter assembly may optionally be retrofit with the anti-drip element after being fully assembled. This feature provides additional flexibility and associated cost saving in the manufacturing process.

As best shown in FIGS. 7A through 7D, representative anti-drip element 100 includes a generally annular ring 102 having a thickness in a longitudinal direction, an inner radius 104 and an outer radius 106. A slot 108, which extends from inner radius 104 to outer radius 106 is provided in annular ring 102. Slot 108 allows anti-drip element 100 to flex during insertion of element 100 into the unfiltered flow path.

Representative anti-drip element 100 further includes a plurality of holes 110 circumferentially spaced around ring 102 and extending in the longitudinal direction through the thickness of ring 102. The number of holes and the diameter of the holes may vary. Typically, representative anti-drip element 100 will include from nine (9) to thirty-six (36) holes, with sixteen (16) holes being shown in the embodiment of FIG. 8 and twenty-four (24) holes being shown in the embodiment of FIG. 6. In general, preferably, the holes are sized such that the surface tension of the fluid prohibits or at mitigates back flow of the fluid through anti-drip element 100. As non-limiting examples, the diameter of each of the twenty-four holes shown in the embodiment of FIG. 6 may be 0.040 inches, while the diameter of each of the twelve holes shown in the embodiment of FIG. 8 may be 0.060 inches. The diameter of each hole 110 may range from approximately 0.020 inches to approximately 0.125 inches. More typically, the diameter of each hole 110 may range from approximately 0.040 inches to approximately 0.060 inches. The diameter of the holes need not be uniform. Those skilled in the art would appreciate that increasing the number of holes and/or increasing the diameter of the holes decreases the pressure drop across the anti-drip element for a given flow rate. Alternatively, those skilled in the art would appreciated that increasing the number of holes and/or increasing the diameter of the holes increases the flow rate for a given pressure drop.

Figure 8:
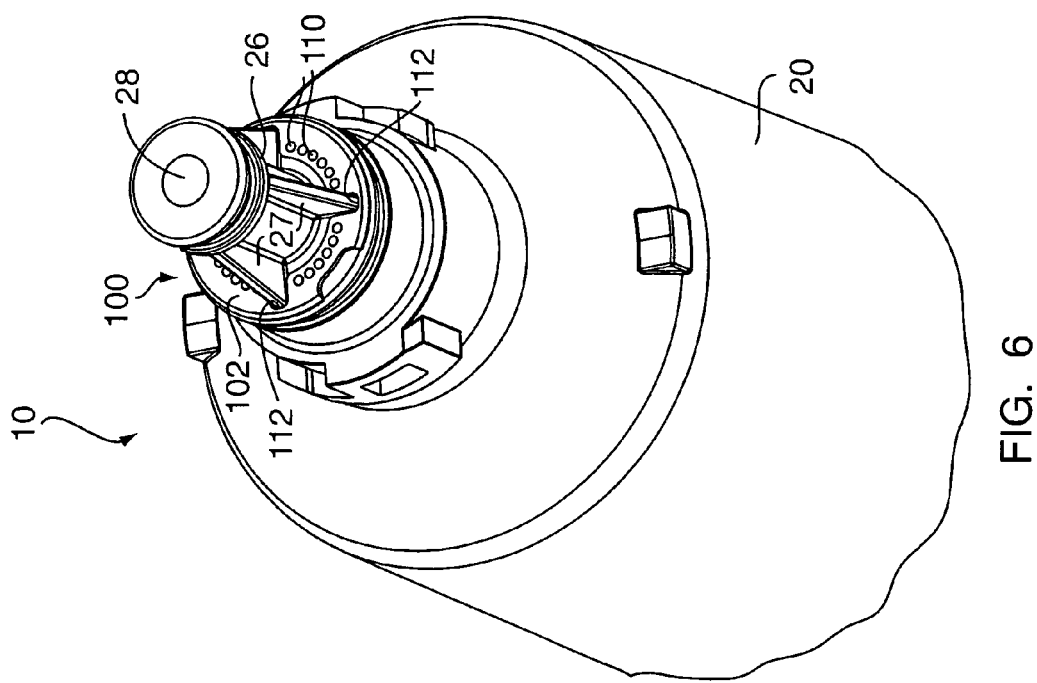
FIG. 8 is a perspective view of another representative anti-drip element according to another representative embodiment of the present disclosure.

Ring 102 may be notched to accommodate structural features of the inlet/outlet top portion 26 of sump 20. Thus, as shown in FIGS. 6 and 8, notches 112 accommodate flanges 27 of top portion 26.

Figure 7A:
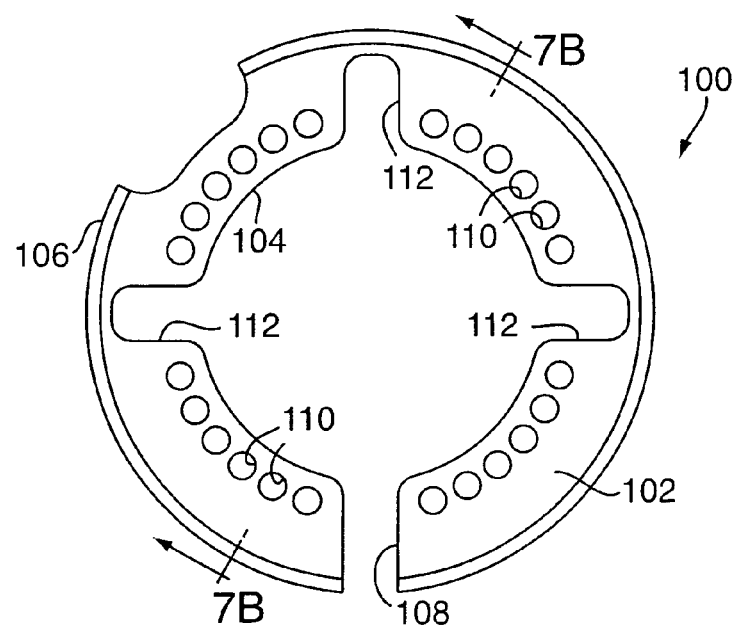
FIG. 7A is a top view of the anti-drip ring according to the representative embodiment of FIG. 5.
Figure 7B:
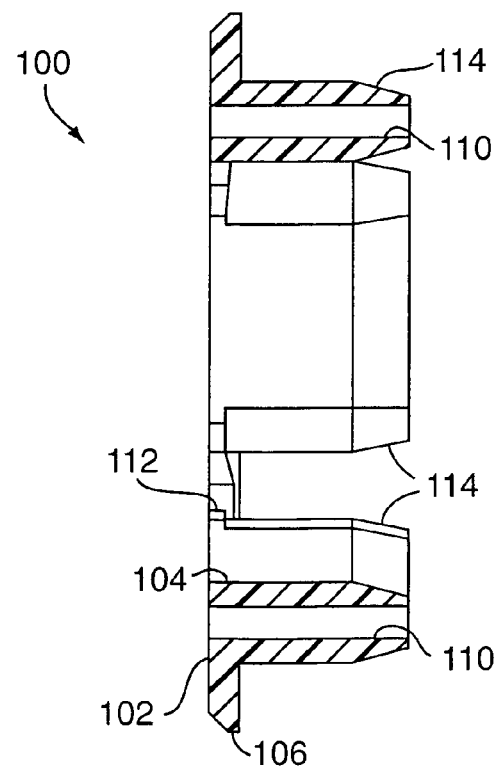
FIG. 7B is a cross-sectional side view of the anti-drip ring according to the representative embodiment of FIG. 5.
Figure 7C:
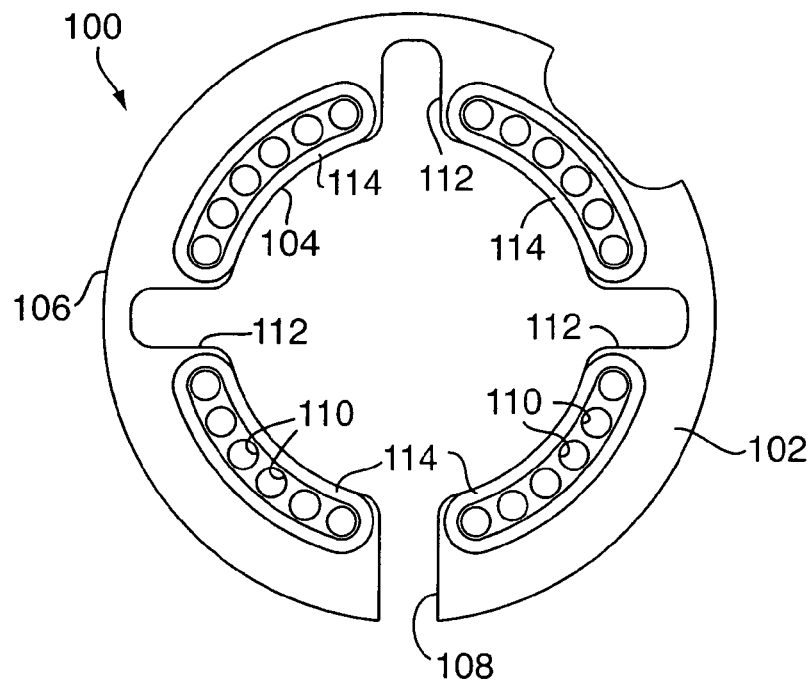
FIG. 7C is a bottom view of the anti-drip ring according to the representative embodiment of FIG. 5.

Representative anti-drip element 100 further includes one or more flanges or legs 114 extending in the longitudinal direction from an annular surface of the annular ring 102. The legs 114 are configured for insertion into the unfiltered fluid flow path of the fluid filter assembly. If the inlet to the unfiltered fluid flow path is formed as a plurality of arcuate-shaped through bores, such as shown in FIG. 5, then, preferably, the legs are provided with a shape that corresponds to the shape of the through bores. Those skilled in the art will appreciate that other shapes for the legs and the inlet to the unfiltered fluid flow path are within the scope of the present disclosure. As best shown in FIG. 7B, each of the holes 110 extends in the longitudinal direction through legs 114.

Figure 7D:
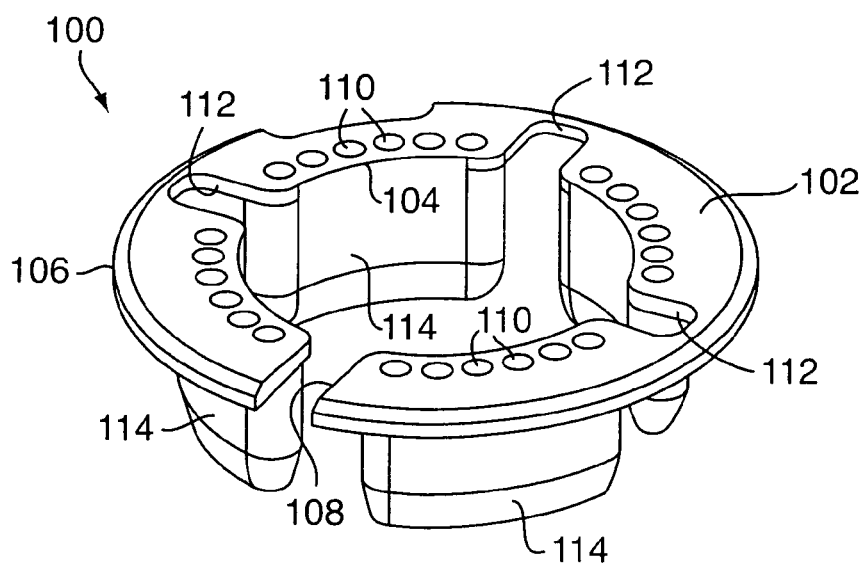
FIG. 7D is a perspective view of the anti-drip ring according to the representative embodiment of FIG. 5.

As shown in FIG. 5, through bores 30 may be circumferentially arranged around through bore 28 of end cap 60. In keeping with the shape of legs 114 of anti-drip element 100, as best shown in FIG. 7D, the inlet of the unfiltered fluid flow may be formed as arcuate-shaped through bores 30. However, the bores need not be arcuate-shaped. There may be one, two, three, four or more bores. The embodiments of FIGS. 6 and 8 each have four through bores. Correspondingly, anti-drip element 100 is shown with four legs, one in each quadrant of the inlet.

Representative anti-drip element 100 may be formed from a relatively rigid plastic. For example, a molded compliant 20% talc-filled polypropylene (Washington Penn PPH4TF2) may be used. Those skilled in the art will appreciate that other materials, more or less rigid, may be suitable.

Although the present disclosure has been described and illustrated with respect to example embodiments, it is apparent that modifications and changes can be made thereto without departing from the spirit and scope of the presently disclosed fluid filter assembly and anti-drip element as defined in the following claims.

What is claimed is:

1. An anti-drip element for use with a fluid filter assembly having an unfiltered fluid flow path and a filtered fluid flow path, the anti-drip element being configured for selective insertion into the unfiltered fluid flow path, the anti-drip element comprising
   a generally annular ring having a thickness in a longitudinal direction, an inner radius, an outer radius;
   a plurality of holes circumferentially spaced around the ring and extending in the longitudinal direction through the thickness of the ring; and
   one or more legs extending in the longitudinal direction from the annular ring, the one or more legs configured for insertion into the unfiltered fluid flow path of the fluid filter assembly, wherein each of the plurality of holes extends in the longitudinal direction through the one or more legs.

2. The anti-drip element of claim 1, wherein the plurality of holes ranges from twelve holes to twenty-four holes and the diameter of each of the holes ranges from approximately 0.040 inches to approximately 0.060 inches.

3. The anti-drip element of claim 1, further including a slot that extends from the inner radius to the outer radius.

4. An anti-drip element for use with a fluid filter assembly having an unfiltered fluid flow path, the anti-drip element comprising:
   a generally annular ring having a thickness in a longitudinal direction, an inner radius and an outer radius;
   a plurality of holes circumferentially spaced around the ring and extending in the longitudinal direction through the thickness of the ring; and
   a slot that extends from the inner radius to the outer radius.

5. The anti-drip element of claim 4, wherein the plurality of holes ranges from nine holes to thirty-six holes and the diameter of each of the holes ranges from approximately 0.020 inches to approximately 0.125 inches.

6. The anti-drip element of claim 4, wherein the plurality of holes ranges from twelve holes to twenty-four holes and the diameter of each of the holes ranges from approximately 0.040 inches to approximately 0.060 inches.

7. The anti-drip element of claim 4, further including one or more legs extending in the longitudinal direction from the annular ring, the one or more legs configured for insertion into the unfiltered fluid flow path of the fluid filter assembly, and wherein each of the plurality of holes extends in the longitudinal direction through the one or more legs.

8. The anti-drip element of claim 4, further including four legs extending in the longitudinal direction from the annular ring, each leg configured for insertion into the unfiltered fluid flow path of the fluid filter assembly, and wherein each leg includes from four to six of the plurality of holes.

9. An anti-drip element for use with a fluid filter assembly having an unfiltered fluid flow path and a filtered fluid flow path, the anti-drip element being configured for selective insertion into the unfiltered fluid flow path, the anti-drip element comprising
   a generally annular ring having a thickness in a longitudinal direction, an inner radius, an outer radius;
   a plurality of holes circumferentially spaced around the ring and extending in the longitudinal direction through the thickness of the ring; and a slot that extends from the inner radius to the outer radius.

10. The anti-drip element of claim 9, wherein the plurality of holes ranges from twelve holes to twenty-four holes and the diameter of each of the holes ranges from approximately 0.040 inches to approximately 0.060 inches.

* * * * *